US006574385B2

United States Patent
Irwin

(10) Patent No.: US 6,574,385 B2
(45) Date of Patent: Jun. 3, 2003

(54) M×N OPTICAL SWITCH WITH IMPROVED STABILITY

(75) Inventor: Michael John Irwin, Gloucester (CA)

(73) Assignee: JDS Uniphase Inc., Ottawa (CA)

( * ) Notice: Subject to any disclaimer, the term of this patent is extended or adjusted under 35 U.S.C. 154(b) by 68 days.

(21) Appl. No.: 09/740,933

(22) Filed: Dec. 21, 2000

(65) Prior Publication Data
US 2001/0031111 A1 Oct. 18, 2001

Related U.S. Application Data
(60) Provisional application No. 60/176,299, filed on Jan. 18, 2000.

(51) Int. Cl.[7] .............................. G02B 6/35; G02B 6/34
(52) U.S. Cl. ............................. 385/16; 385/17; 385/18; 385/36
(58) Field of Search ............................. 385/16, 17, 18, 385/19, 36; 350/96

(56) References Cited
U.S. PATENT DOCUMENTS

| 4,671,613 A | * | 6/1987 | Buhrer ...................... 359/495 |
| 5,436,986 A | * | 7/1995 | Tsai .......................... 385/16 |
| 5,594,820 A | * | 1/1997 | Garel-Jones et al. .......... 385/18 |
| 5,841,917 A | * | 11/1998 | Jungerman et al. ........... 385/15 |
| 5,867,617 A | * | 2/1999 | Pan et al. ..................... 385/16 |
| 5,999,669 A |   | 12/1999 | Pan et al. ..................... 385/18 |

FOREIGN PATENT DOCUMENTS

| JP | 62246017 A | * | 10/1987 | ............. G02F/1/33 |
| JP | 01046721 A | * | 2/1989 | ........... G02B/26/08 |
| JP | 01154017 A | * | 6/1989 | ........... G02B/26/08 |

* cited by examiner

Primary Examiner—John D. Lee
Assistant Examiner—Daniel Valencia
(74) Attorney, Agent, or Firm—Neil Teitelbaum

(57) ABSTRACT

Optic switches manipulate an optical signal that has been expanded by a collimating lens. Switching is effected by introducing a prism between collimating lenses to redirect the optical signal to an alternative lens. The prism preferably has a cross-section defining a parallelogram, so that the optical signal is reflected twice within the prism to minimize cross-sectional distortion and avoid spectral effects. A circuit provides feedback on the actual position of the relay and prism for fault detection and diagnosis.

5 Claims, 7 Drawing Sheets

M×N OPTICAL SWITCH WITH IMPROVED STABILITY

This application claims priority from Provisional Patent Application Ser. No. 60/176,299, filed Jan. 18, 2000.

FIELD OF THE INVENTION

The present invention relates generally to fiber optic networks, and in particular, to switches for directing optical signals along selected fibers of an optical network.

BACKGROUND OF THE INVENTION

In fiber optic networks, light signals are transmitted along optical fibers to transfer information from one location to another. A light signal must be accurately entered into an optical fiber, or much of the signal strength will be lost. Modern optical fibers are very small in cross-section, and typically have a fairly narrow acceptance angle within which light entering the fiber should fall to promote efficient propagation of the light signal along the fiber. Therefore, optical switches generally rely on precise and selectable alignment between one or more input optical fibers and one or more output optical fibers. The alignment requirements of modern single mode optic fibers are particularly stringent, as their core diameters are typically as small as 2.0 to 10.0 m$\mu$.

In known electromechanical optical switches, the switching operation is often effected by precise movement of the ends of the input fibers relative to the ends of the output fibers, or by accurately moving a mirror to redirect the optical signals to a selected output fiber without moving the optical fibers themselves. Unfortunately, these accuracy and precision requirements substantially increase the cost and decrease the reliability of known optical switches.

Alternative known optical switch structures split the signal and selectively block the undesired optical pathways. Such switches are highly inefficient, requiring repeated signal amplification. Repeated amplification is costly, and also increases the potential for noise and distortion of the original optical signal. These disadvantages are compounded in complex optical switches which provide multiple alternative pathways with simultaneous switching, such as in 2.times.2 switches, N.times.N switches, N.times.M switches, and the like.

A particular challenge with electromechanical fiber optic switches is that they operate as an interface between two data transmission mediums. While the goal of these structures is to provide switching between optical fibers, they will often be actuated by electro-servos. Hence, when switching failures occur, it may be difficult to determine whether the failure lies in an optical component of the network, an optical component of the switch, an electrical component of the switching control circuitry, or an electromechanical component of the switch itself.

U.S. Pat. Nos. 5,867,617 and 5,999,669 to Pan et al. address some of the above problems by proposing M×N fiber optic switches utilizing a number of parallelogram-shaped prisms between input and output optical fibers for redirecting optical signals to alternative outputs. It is noted that, while the Pan proposal is useful and operable in a variety of configurations, including 1.times.2, 2.times.2, N.times.N, and M.times.N, with good switching performance, and at an affordable cost, it may suffer from a disadvantage caused by temperature instability.

It is desirable to provide temperature stability for optical switches e.g. of the type as disclosed in the Pan patents, supra. The extremely close tolerances that exist in modern optical switches can be affected in such a way as to cause a reduction in the amount of light transmitted through the switch when the switch is subjected to high ambient temperatures. Such temperatures can exist inside telecommunication equipment cabinets. These temperatures cause the elements within the switch, e.g. the cantilever-type actuators of Pan et al '699 patent to expand and alter the placement of the components of the switch. While the thermal expansion cannot be eliminated, it would be desirable to minimize its effect.

SUMMARY OF THE INVENTION

The invention partly modifies the concept of Pan et al, U.S. Pat. No. 5,867,617, by providing for a linear displacement of the prisms relative to respective optical paths, preferably by linear displacement of prism-supporting means. The provision of the linear displacement alleviates or reduces the effects of thermal expansion on the prism positioning in the respective optical path.

The thermal stability does not result only from the fact that the motion is linear. It results also from the fact that the actuators can be more robust and are not limited to to having to be of a relatively low mass. In the case of a linear actuator as in FIG. 1, the actuator actually slides on the base of the switch. In USP '617, supra, actuators must lift the entire mass of the cantilever arm and the prism. The present concept can be applied to any linear motion perpendicular or essentially perpendicular to the optical path.

Thus, in accordance with the invention, there is provided an optical switch comprising at least one optical input assembly and at least one output assembly, at least one prism displacement means supporting at least one prism thereon and operable to be moved between a first position and a second position, the first position corresponding to the at least one prism being disposed in an optical path between said at least one input assembly and the at least one output assembly, and the second position corresponding to the at least one prism being disposed out of the optical path, wherein the prism displacement means are linearly movable means for movement between the first and the second position.

It is preferable but not mandatory that the displacement means are mounted for movement in a direction generally perpendicular to the respective optical paths.

BRIEF DESCRIPTION OF THE DRAWINGS

In the drawings which illustrate the invention in more detail.

DETAILED DESCRIPTION OF THE INVENTION

Figure 1:
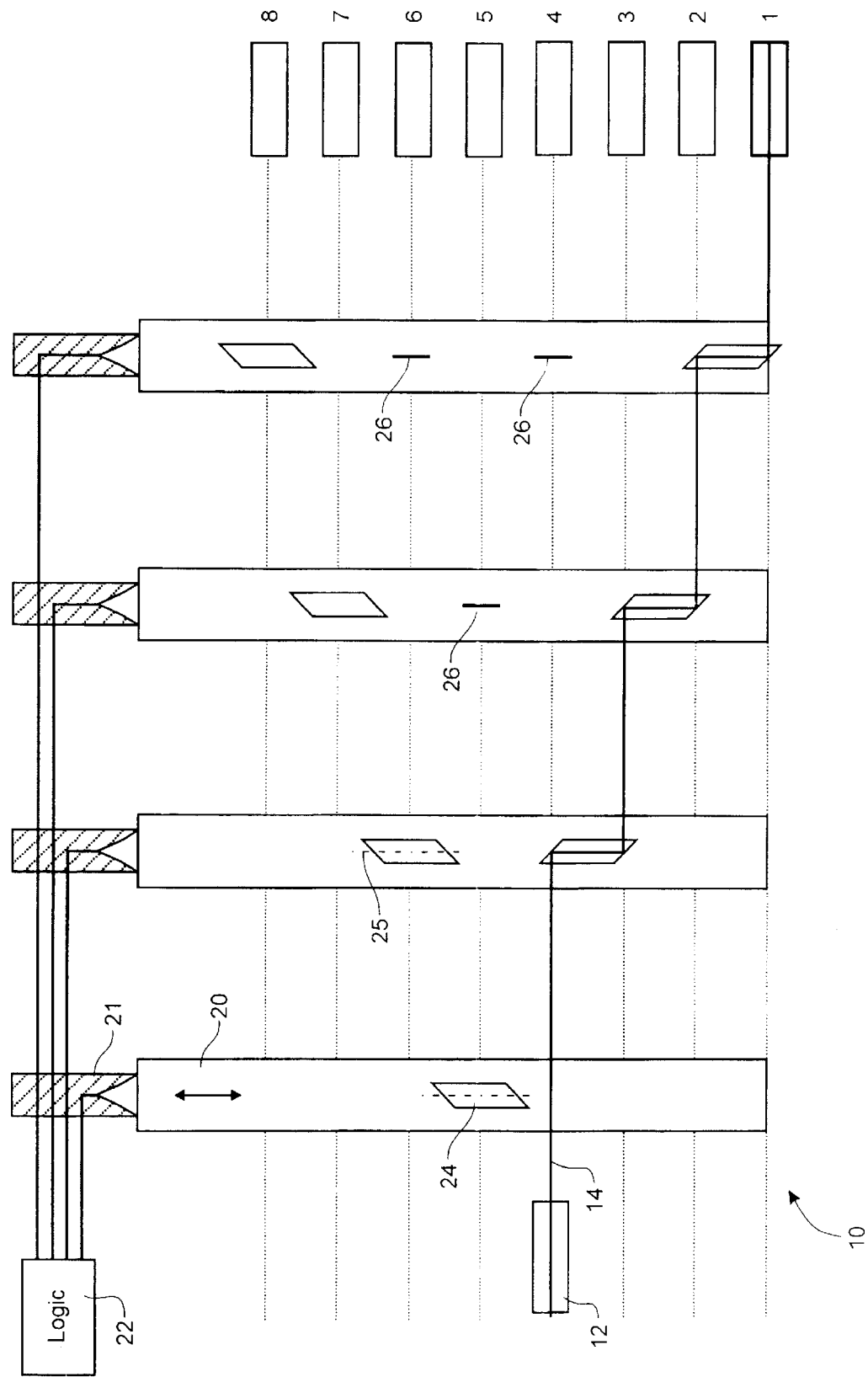
FIG. 1 schematically illustrates, in a plan view, the structure and operation of a 1×8 switch according to one embodiment of the invention.
Figure 2:
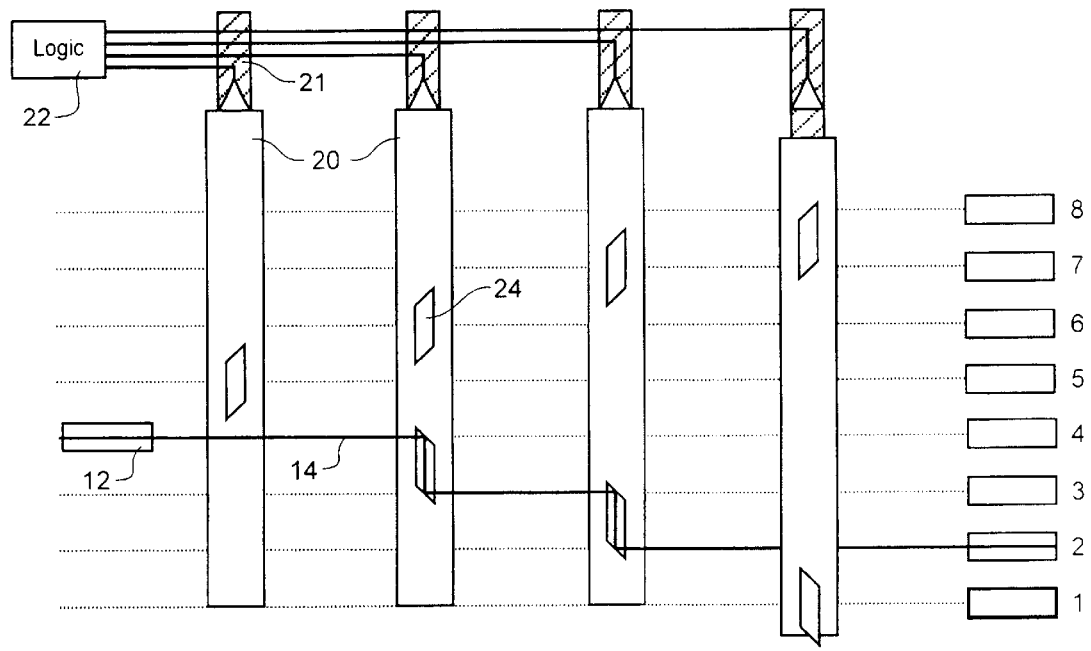
FIGS. 2–5 illustrate in a plan view the switch of FIG. 1 in alternative switching positions, FIG. 6 schematically illustrates in a plan view the structure and operation of a 1×8 switch according to another embodiment of the invention.
Figure 3:
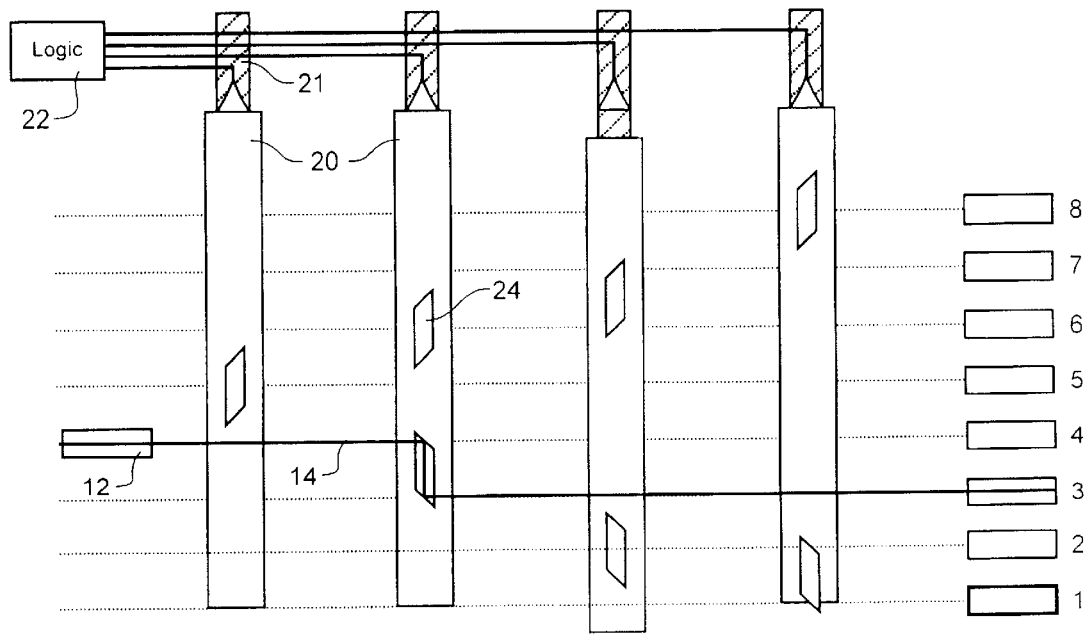
Figure 4:
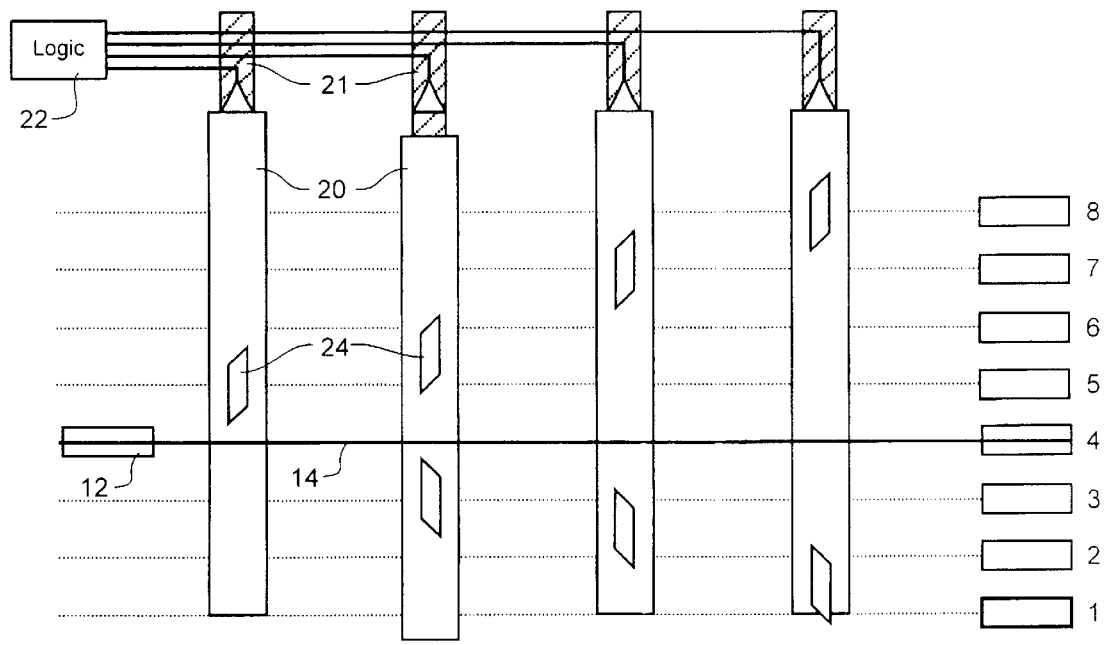
Figure 5:
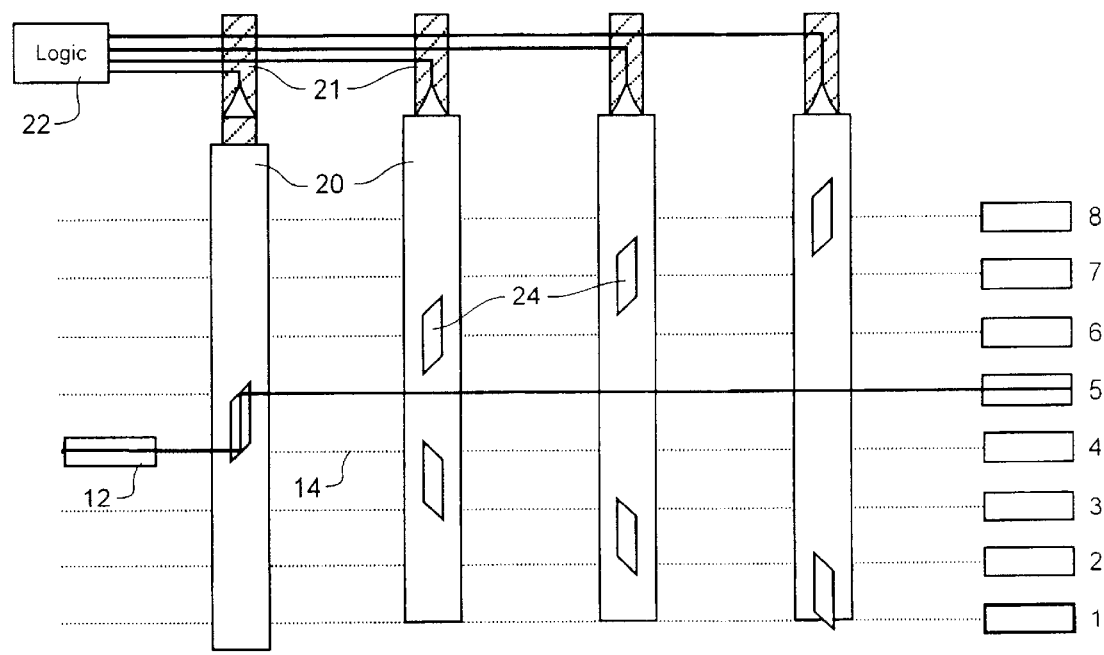

The switch of the invention is designed to allow the movement of internal elements of the switch while minimizing the effect of ambient temperature variation on the optical performance of the switch.

The design applies to M×N switches where M and N can vary from zero to an arbitrarily high number. For example, the switch may be a 1×N switch, a N×1 switch or a M×N switch where M and N are greater than 1. Preferably, the switch may have a single input and any number of outputs (1 times N) as shown in FIGS. 1–9 or any number of inputs with a single output (N times 1) that is achieved by reversing the inputs and outputs in FIGS. 1–9. While not illustrated, it is easily conceivable to design a M×N switch (M and N greater than 1) using the invention.

Turning to FIGS. 1–5, a switch 10 has a single input assembly 12 consisting of a fiber and lens unit. The input assembly collimates the light from the optical fiber into an optical beam 14 that can be displaced by the prisms. The beam 14 exemplifies optical path for the purpose of the invention. Both the input and output assemblies incorporate for example well known GRIN lenses, not illustrated. Alternatively, any other collimating lenses can be used, e.g. axial gradient lenses or aspherical lenses. A plurality of output assemblies accomplished the reverse operation by coupling an output beam 16 into an output optical fiber, e.g. fiber 1 on FIG. 1. Switching is accomplished by way of prisms 18 having a cross section defining an oblique-angle parallelogram, or a rhomboid, mounted on bars 20 oriented perpendicular to the direction of the path 14 of the collimated beam within the switch. These prisms are moved into the path of the light beam, in combination, to direct the beam of light through multiple prisms to the output assembly similarly as described in the U.S. Pat. No. 5,867,617 the specification of which is hereby incorporated by reference.

Figure 9:
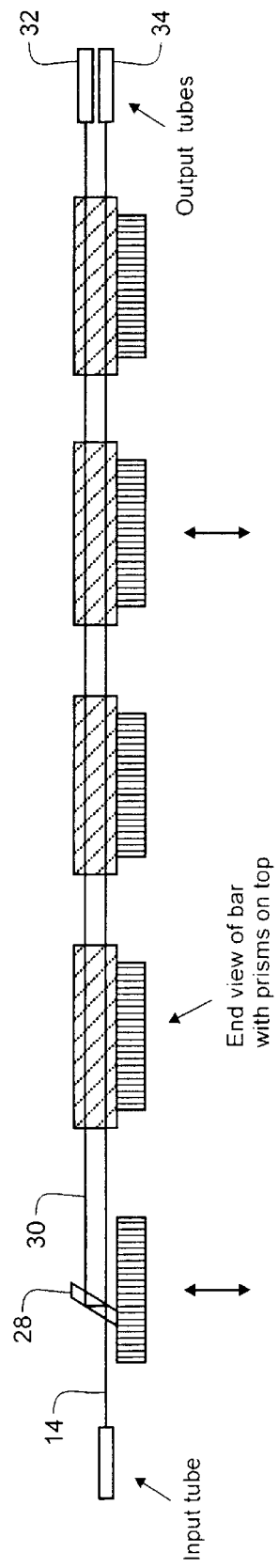
FIG. 9 illustrates schematically, in a side view, the structure and operation of a two-plane embodiment of the switch of the invention.

The bars 20 may be moved (displaced) either longitudinally, as represented by the arrow in FIG. 1, or laterally, e.g. vertically, as represented by arrows in FIG. 9. In either case, the displacement is linear rather than angular. The linearity can be accomplished by way of well-known mechanical means, e.g. guides (not illustrated). When displaced, the bars should be latched in position using known latching means, e.g. magnetic means, not illustrated herein.

The prisms are moved into an optical path 14 selectively as desired. Various known types of actuators 21 can be used to the effect. In the embodiments illustrated, electronic logic units 22 are provided to interpret commands for a particular channel and move the appropriate bars 20 into position to direct the collimated beam. Electronic sensors within the switch, not shown in the drawings, sense the position of the bars and provide feedback through an appropriate logic.

The bars of the switch occupy preferably only two positions, with the respective prisms either interrupting a beam of light or not. The light beams travel along parallel prescribed optical paths in the switch. The action of the prism is to direct the light from one path to the adjacent path, and to this effect the angles of the parallelogram are selected such as to minimize cross-sectional distortion and avoid spectral effects. Preferably, the prisms in FIGS. 1–5 are arranged with the longitudinal axes (herein termed "optical axes") 25 of the parallelograms being perpendicular to the incident optical beam (optical path). The bars 20 are movable linearly rather than angularly as in the '617 patent, supra. Preferably, but not necessarily, the bars are also operable in a direction perpendicular to the respective optical paths, or more generally, are movable in a manner enabling a constant angular position of the prisms relative to the optical paths. While it is shown in FIGS. 1–5 that the longitudinal optical axes 25 of the prisms 20 are generally perpendicular to the optical paths, this is not essential. Neither the bars have to move perpendicularly to the optical beams, nor the prisms have to be arranged such that their axes are positioned perpendicular to the optical paths as illustrated. It is important, however, that the prisms are disposed for the optical beams to undergo double internal reflection (FIGS. 1–5) or double refraction (FIGS. 6–8) and be coupled to a selected output assembly.

In the embodiment illustrated in FIGS. 1–8, the switch operates in a 1 times N configuration. The bar nearest the input lens assembly 12 has a single prism 24 which, when placed in the path of the collimated beam 14 directs it to a new path parallel to the first. All other bars support each two prisms positioned so that when the bar is moved, the prism interrupts the beam from the previous bar nearer the input. By using a combination of prisms, a beam can be directed to any of 2 times M outputs where M represents the number of bars.

Figure 6:
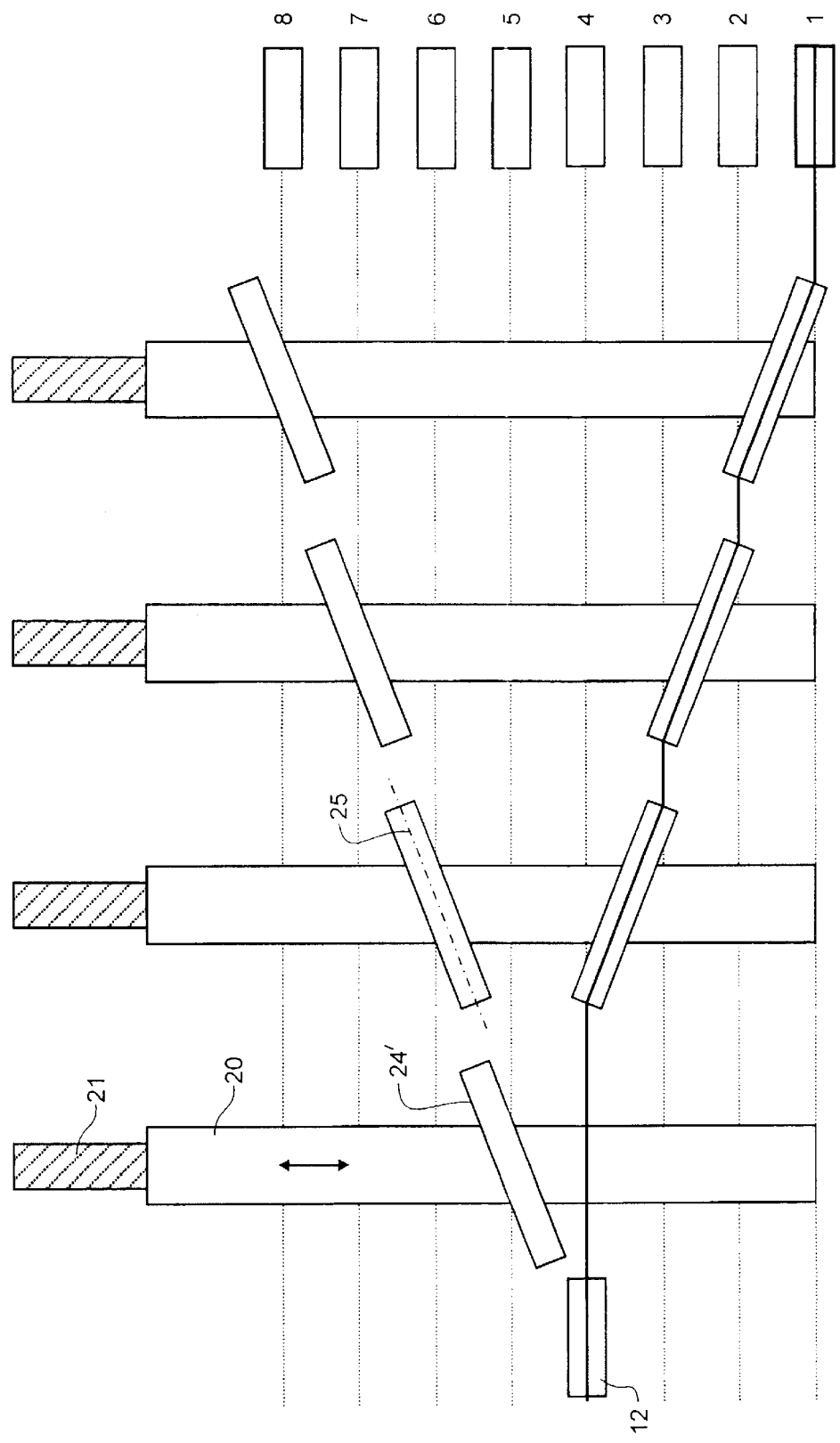
Figure 7:
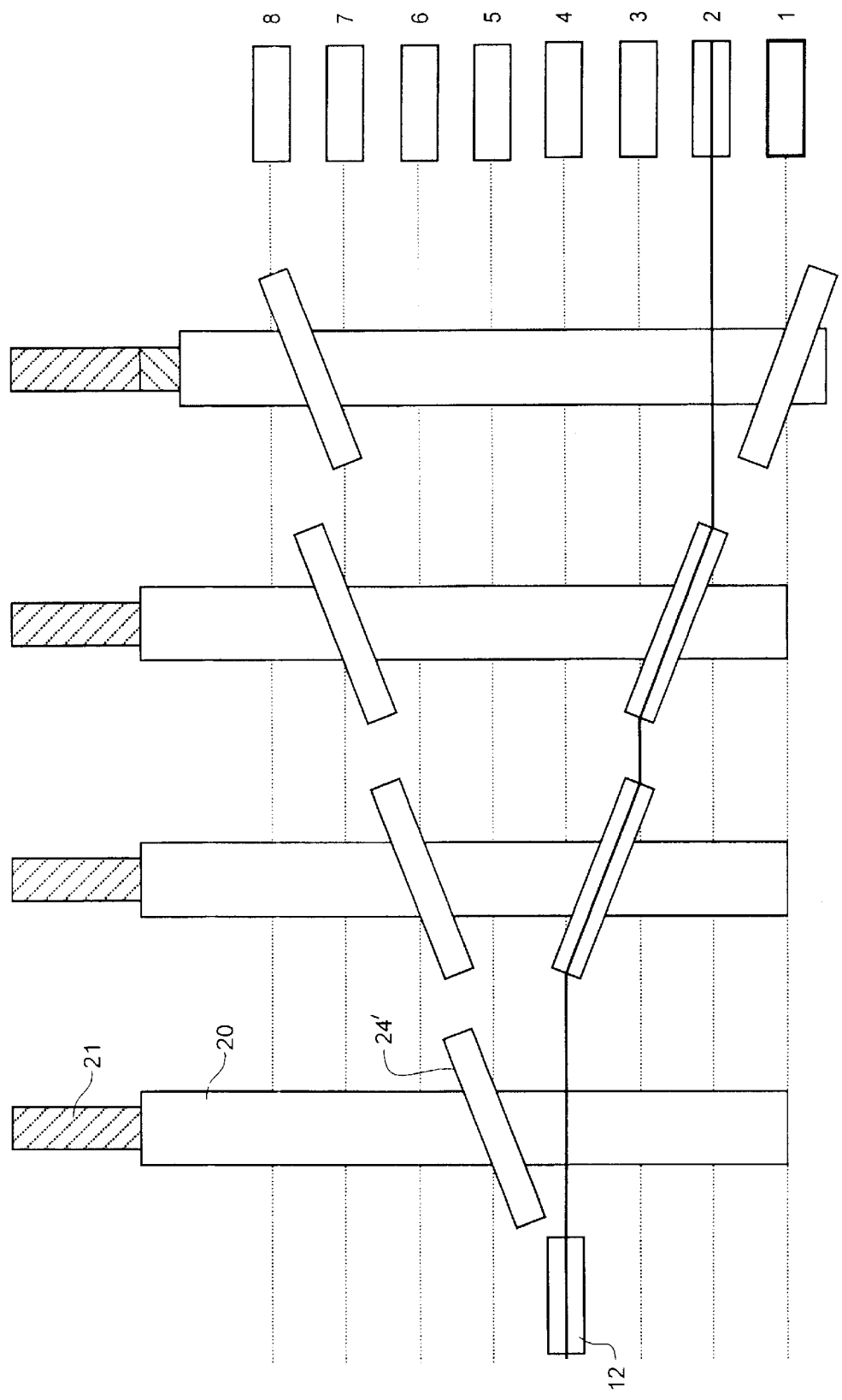
FIGS. 7 and 8 illustrate, in a plan view, the switch of FIG. 6 in alternative switching positions.
Figure 8:
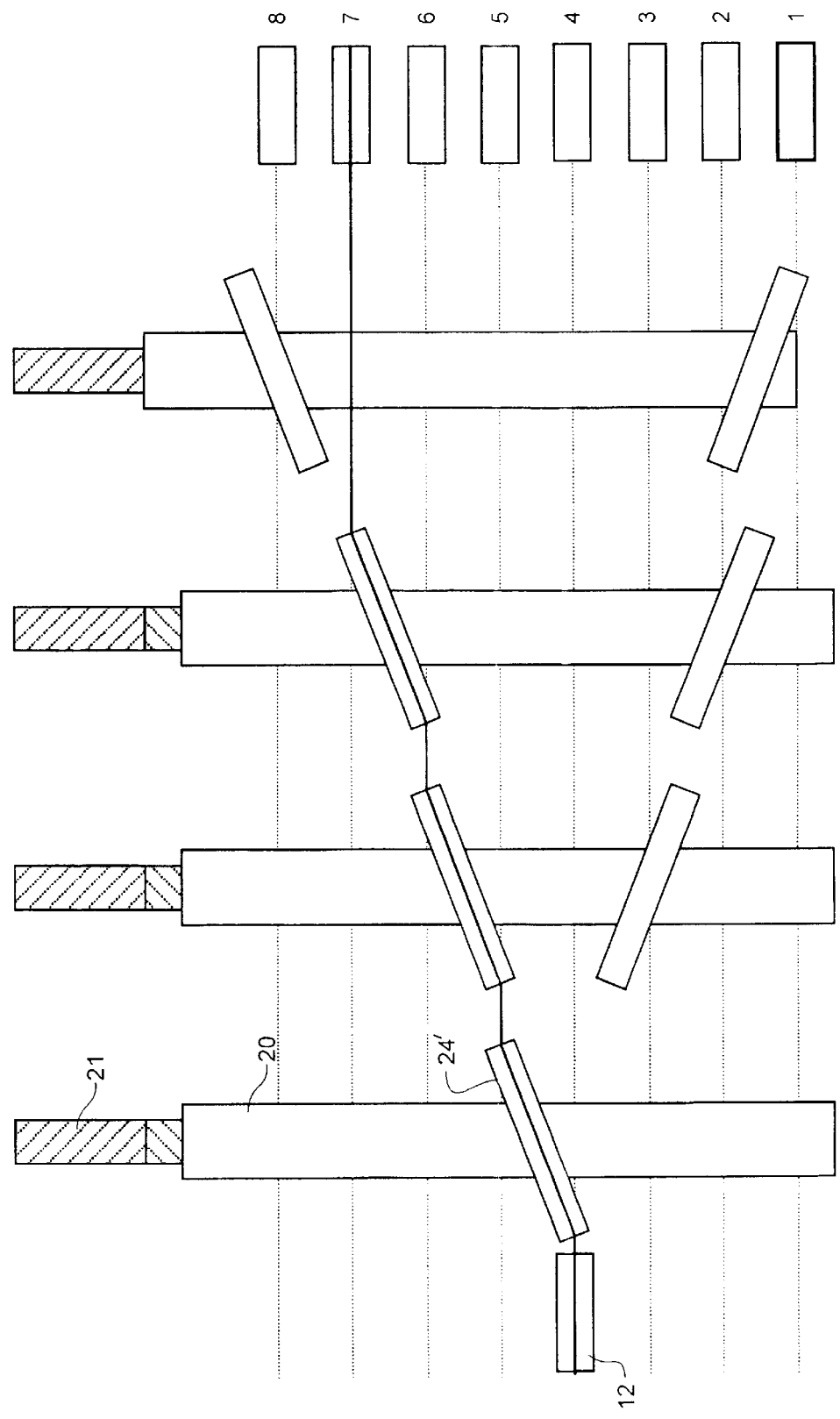

Turning now to FIGS. 6–8, the prisms 24' are rectangular in cross-section and arranged such that light from the input assembly 12 enters the selected prisms and exits them by way of double refraction. The displacement bars 20 move the prisms linearly between two positions, in and out of the optical path respectively, preferably in a direction perpendicular to the optical paths while the prisms are arranged angularly to accommodate an optimum passage of the optical signal therethrough. The length of the prisms 24' and their refractive index determine the positioning of the prisms so as to properly displace the optical beam for switching purposes. In the examples illustrated in FIGS. 6–8, the optical paths are selected between an input assembly 12 and one of the output assemblies 1–8. Of course, the arrangement can be reversed.

It will be noted that the switches as illustrated can operate in an N times 1 configuration by reversing the sides (left and right) of the systems as illustrated. In the N×1 mode, light from a selected input fiber is interrupted by one or more prisms and directed successively to the center beam path where it is focused on the output lens assembly.

By adding an opaque element 26 (FIG. 1) to one of the bars, the switch can be used to completely block the light.

It will be noted that in FIGS. 1–8, the prisms are arranged such that their optical axes 25 define a single plane (the plane of the drawing) which is also co-extensive with the plane of the input and output assemblies 12, 1–8.

A further expansion of the capabilities of the switch can be made (FIG. 9) by inserting a bar e.g. nearest the input which uses a prism to move the plane of the light beam to a higher level. Specifically, a level-control prism 28 is arranged such that its output 30 defines a different plane relative to the basic optical plane of the switch that is represented by the plane of drawing on FIGS. 1–8. As can be seen, FIG. 9 represents a 1×2N configuration wherein N is the number of output channels provided within either the lower level 34 or the upper level 32. The same principle can be used to create a 1×LN switch where L is the number of levels.

It should be noted that the FIG. 9 is a side view of a switch of the invention while FIGS. 1–8 represent a top view.

The arrangement of FIG. 9 allows the light to travel either through the prism 28 to the upper row 32 of the output lens assemblies, in an upper plane, or to the lower row 34 of the output assemblies 34 on a lower, basic plane when the prism 28 is out of the optical path.

Numerous embodiments of the invention are conceivable within the scope and spirit of the invention as defined by the appended claims.

What is claimed is:

1. An optical switch comprising:
   at least one optical input assembly and at least one output assembly,
   at least two prism displacement means, of which at least one displacement means supports at least two parallelogram prisms thereon, all the displacement means operable to be moved between a first position and a second position, the first position corresponding to the at least one parallelogram prism being disposed in an optical path between said at least one input assembly and the at least one output assembly, and the second position corresponding to the at least one prism being disposed out of the optical path, the at least two prisms on the at least one displacement means separated and spaced from each other in a direction of movement of the at least one displacement means,
   wherein said prism displacement means are linearly movable means, and wherein said at least two prism displacement means is a set of at least two bars mounted for a displacement parallel to each other between the first position and the second position.

2. An optical switch comprising:
   at least one optical input assembly and at least one output assembly, at least two prism displacement means, of which at least one displacement means supports at least two parallelogram prisms thereon, all the displacement means operable to be moved between a first position and a second position, the first position corresponding to the at least one parallelogram prism being disposed in an optical path between said at least one input assembly and the at least one output assembly, and the second position corresponding to the at least one prism being disposed out of the optical path, the at least two prisms on the at least one displacement means separated and spaced from each other in a direction of movement of the at least one displacement means, wherein said prism displacement means are linearly movable means, the switch comprising at least two prisms arranged such that their outputs define at least two planes, the output assemblies arranged in said at least two planes.

3. The switch according to claim 2 wherein said at least one displacement means is a set of at least two bars mounted for displacement parallel to each other between the first position and the second position.

4. An optical switch comprising
   at least one input assembly and a first output assembly disposed to define a first plane of optical paths between said input assembly and said output assembly,
   at least a second output assembly disposed to define a second plane parallel to said first plane,
   a first linearly movable displacement means supporting at least one parallelogram prism and operable to be moved between a first position and a second position, the first position corresponding to the at least one prism being in an optical path between the at least one input assembly and one of said output assemblies, and the second position corresponding to the at least one prism being out of said optical path,
   at least another linearly movable displacement means supporting at least two parallelogram prisms and operable to be moved between a first position and a second position, the first position corresponding to the at least one parallelogram prism being disposed in an optical path between said at least one input assembly and one of said output assemblies, and the second position corresponding to the at least one prism being disposed out of said optical path,
   wherein the at least one parallelogram prism on the first displacement means is disposed for switching an optical beam from said input assembly between said first plane and said second plane by double reflection of the optical beam in said one parallelogram prism when said first displacement means is moved between said first position and said second position.

5. The switch of claim 4 wherein the at least two parallelogram prisms on the at least another linearly movable displacement means are separated and spaced from each other in the direction of movement of the at least another displacement means.

* * * * *